(Specimens.)
E. MAERTENS.
PROCESS OF REFINING WOOL FAT AND PRODUCTS RESULTING THEREFROM.
No. 539,388. Patented May 14, 1895.
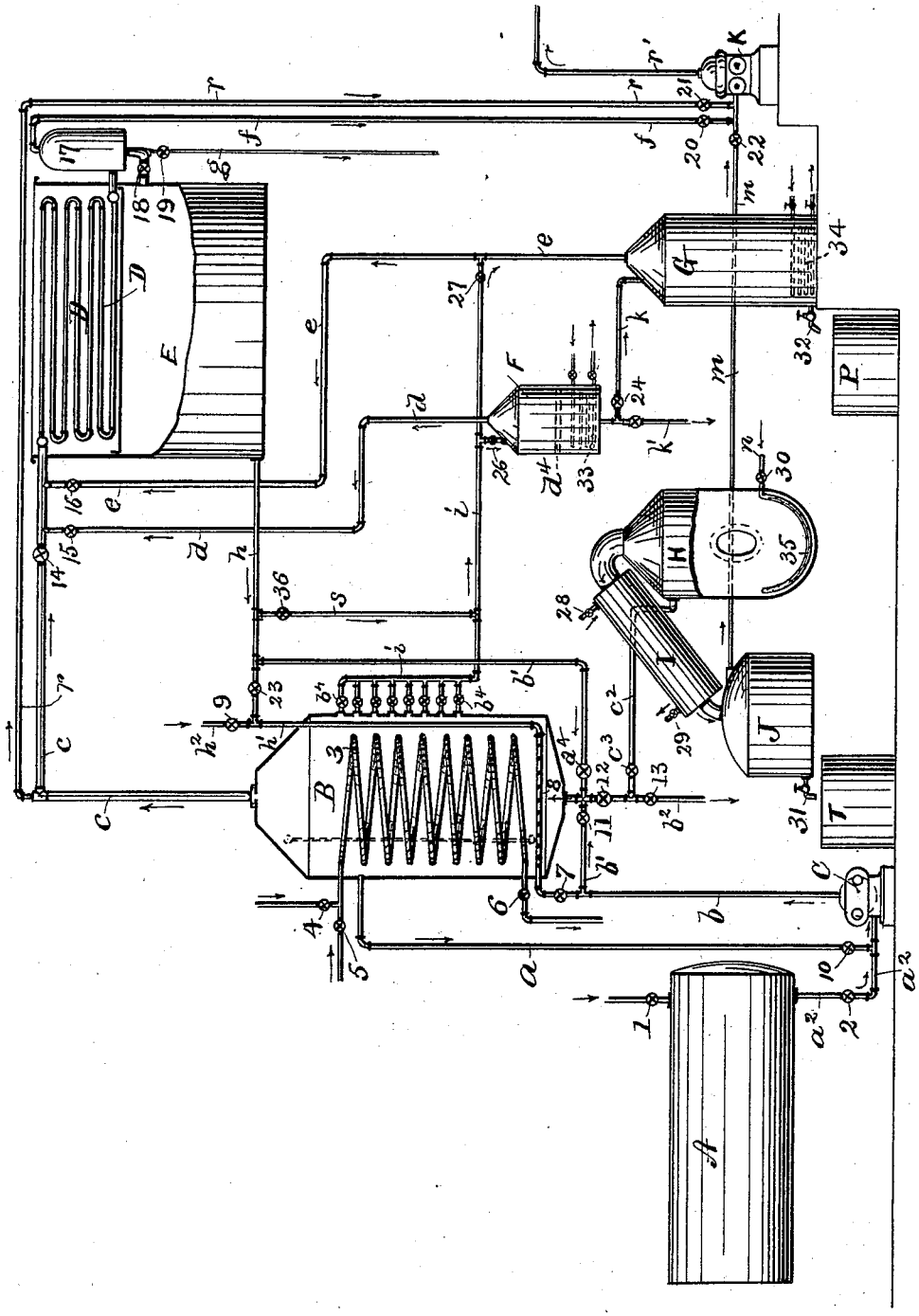
Witnesses:
Fred. Arnold.
Ida M. Warren.
Inventor:
Emile Maertens—
by Remington & Henthorn
Att'ys.

UNITED STATES PATENT OFFICE.

EMILE MAERTENS, OF PROVIDENCE, RHODE ISLAND.

PROCESS OF REFINING WOOL-FAT AND PRODUCTS RESULTING THEREFROM.

SPECIFICATION forming part of Letters Patent No. 539,388, dated May 14, 1895.

Application filed March 12, 1894. Renewed January 28, 1895. Serial No. 536,497. (Specimens.)

*To all whom it may concern:*

Be it known that I, EMILE MAERTENS, a citizen of the United States, residing at Providence, in the county of Providence and State of Rhode Island, have invented certain new and useful Improvements in Processes of Treating and Refining Wool-Fat and Extracting Products Therefrom; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in methods or processes of treating and refining wool-fat, and also to certain new and useful commercial products produced by means of such improved process.

It is well known that the fat extracted from raw wool through the agency of ether, bi-sulphide of carbon, benzine or other well known methods varies in color, say from a straw color to a dark brown, according to the nature and condition of the wool from which it is obtained, the process employed in its extraction and also to the temperature, methods and apparatus used in its separation from the vehicle or body by which it is carried. I may further add that the odor, consistency and composition of the wool-fat are also affected by the foregoing and also by the following conditions, viz:—by the treatment the raw wool may have been subjected to before its extraction or the treatment the fat may have been subjected to after its extraction from the wool and by the degree of perfection attained in eliminating the solvent or other impurities from the fat; the resulting products being in a degree affected thereby.

I have discovered that the wool-fat extracted from raw wool by solvents or by other methods may be separated or divided into at least two new products, both being the constituents of wool-fat obtained in the manner stated above. By the employment of my improved process the resulting products consist of a refined, opaque fatty matter not soluble or but sparingly soluble in cold alcohol and precipitated from hot alcohol in cooling, and also of a product, sometimes transparent and sometimes translucent, possessing a resinous, sticky or gummy nature, and which is soluble in cold alcohol, all as will be more fully hereinafter set forth and claimed. I will call the product first referred to and as being insoluble in cold alcohol as No. 1, whereas the second product referred to and described as soluble in cold alcohol I term No. 2.

In the accompanying sheet of drawings I have represented an organized apparatus well adapted to carry out my improved process of treating and refining wool-fat for the production of the two new products, No. 1, and No. 2, before referred to.

The following is a description of the apparatus, illustrated herewith, for refining wool-fat and the manufacture of the said new products.

A designates a reservoir termed a grease-tank, for containing raw wool-fat, provided with a valved inlet 1 and outlet 2, the latter connecting with pump C through piping $a^2$.

B indicates the separating tank, provided interiorly with a coil 3, the latter having a valved inlet 4 communicating with a steam supply and a valved inlet 5, connected with a cold water supply. The coil extends through the lower portion of the tank and has an outlet valve 6.

C is a pump, its suction or inlet communicating with tank A through valve 2 and with the upper portion of separator B through piping $a$ and valve 10. The discharge from the pump is through vertical pipe $b$, valve 7, and perforated pipe 8 located in the bottom of the separator, and is adapted to discharge into the atmosphere through pipes $b'$, $b^2$, and valves 11, 12 and 13.

D is a surface condenser, mounted in a suitable casing, the same communicating at its upper part or inlet with the separator B through piping $c$ and valve 14, and with the filter F through piping $d$ and valve 15; and also with still G, through piping $e$ and valve 16, all as clearly shown. The outlet of the condenser D communicates at the bottom with a vacuum chamber 17, and through piping $f$ and valve 20 with the inlet pipe $m$ of the vacuum pump K. The vacuum chamber is also in communication with the reservoir E through the valve 18, and with the atmosphere through valve 19 and pipe $g$. The said reservoir E contains solvent, and as drawn is located directly below the condenser D. It communicates at the bottom with the separating tank B through piping $h$, $h'$ and valve 23. The pipe $h'$ extends downwardly into the tank and connects with the perforated pipe 8. The upper portion of pipe $h'$ communicates with a hot-air pipe $h^2$ having a stop-valve 9.

The filter F, before referred to, contains a steam coil 33 placed below the filtering medium $d^4$. The filter inlet is in communication with separator B through pipe $i$, valve 26 and the series of try-valves $b^4$, the latter being located along the vertical wall of the separator. The filter outlet communicates with the still G through valve 24 and pipe $k$, and with the atmosphere through valve 25 and pipe $k'$.

The still G is provided with an internal steam coil 34. The still connects with the separator B through the said piping $e$, $i$ and valves $b^4$, and the interposed valve 27, and with the filter F through pipe $k$ and valve 24, as before stated. The outlet of the still G is at the bottom, through cock 32.

The apparatus is provided with another still H. It contains at the bottom a bent perforated pipe 35 communicating with a pipe $n$ for conducting superheated steam; a valve 30 being used used to control its admission to the pipe 35. The still also communicates with the separator B through pipe $c^2$, $b^2$ and valves $c^3$, 12. The outlet of the still is into and through a condenser I and thence into a receiver J. The said condenser I condenses the vapors from the still H. The cold water used in the condenser enters at the top through valve 28 and escapes through valve 29 at the bottom.

J is a receiver for the distillate from still H. It has an outlet or draw-off cock 31 at the bottom and is in communication with the vacuum pump K through pipe $m$ and valve 22.

In carrying out my improved method or process of refining wool-fat and the production and separation from it of the new products, hereinafter referred to and designated No. 1, and No. 2, I employ the foregoing described instrumentalities, substantially as follows: The wool-fat is placed in the grease-tank A where it is kept in a fluid state by means of heat. Now upon opening valves 2 and 7 and starting pump C the fluid wool-fat is pumped into the separating tank B through the pipes $a^2$ $b$ and perforated pipe 8 until the separator is say half-filled with wool-fat. The pump is now stopped, the valves 2 and 7 closed, and valves 9 and 21 opened and the vacuum pump K started. The valve 9 admits warm air or steam to the separator, through pipes $h^2$ $h'$ and 8; the action of the pump K being to suck or draw the air or steam upwardly through the fat and thence it passes via the pipes $c$, $r$ and valve 21 to the said pump. The air or steam in passing through the separator charges itself with the more volatile compounds or odors present in the fat, thus partly freeing the volatile matter from the fat, the surcharged air or steam being discharged from the pump through piping $r'$. After continuing this operation sufficiently long the valve 9 is closed, followed by raising the temperature of the fat through the medium of the heating coil 3, steam being admitted to the latter through valve 4. Under the combined influence of the heat and vacuum, practically all the remaining moisture or vapor, volatile and odorous products are eliminated and carried over by the action of the pump K. If desired, however, said products can be passed through the condenser D and collected in chamber 17 by opening valves 14 and 20 and closing valve 21, the pump meanwhile being in operation.

When the fat has been under the influence of heat and vacuum sufficiently long, the pump K is stopped, and valves 14, 21 and 4 closed, and valves 23 and 10 opened. Cold alcohol from reservoir E now runs into the separator B through perforated pipes 8 until the separator is nearly full. The valve 7 is then opened and valve 23 closed and pump C put in motion. The alcohol is then drawn by the action of the pump from the top of the separator and is injected at its bottom through the perforated pipes 8 and kept passing and repassing through the wool-fat until it becomes saturated with that part of wool-fat which I find is soluble in cold alcohol. The pump C is then stopped, the solution allowed to settle, and when clear it is drawn off into the still G through piping—i. e., by opening the valve 27 and one or more of the valves $b^4$ on separator B. This washing of the fat with cold alcohol is repeated and continued until that part of the fat which I have discovered is soluble in cold alcohol has been entirely removed from the fat. When all the alcoholic solution which can be drawn from the separator has been removed from it, steam is turned on to the coil 3, as before stated, and the separator put into communication with the condenser D, vacuum chamber 17 and reservoir E by opening valves 14, 18 and 21 and starting pump K. The alcohol contained in the fat which remains in separator B is soon distilled off under the influence of heat and vacuum and what then remains in the separator is my new product No. 1, which can be run off through valves 12 and $c^3$ into the still H for further distillation, or directly into the product tank T. As soon as any saturated or charged alcohol from the separator is run into the still G, the latter is put in operation by turning steam on to the coil 34 and opening valves 16, 18, 21, thus effecting the distillation and returning to the reservoir E the pure alcohol which previously contained in solution my other new product No. 2 and which latter is drawn from still G at 32 into the product tank P.

Instead of treating wool-fat with cold alcohol in the separator B, it can be treated in the same manner with hot or boiling alcohol, which is heated by coil 3, but as boiling alcohol dissolves some parts of No. 1 product as well as the whole of No. 2, it is necessary in order to separate the latter from the former to precipitate such parts of No. 1 product by cooling the alcohol solution and to settle and filter out this precipitate from the solution of No. 2 product. The cooling is done by shutting valve 4 and opening valve 5 which supplies cold water to coil 3 instead of steam. When the suspended product No. 1 has been precipitated, the clear liquid containing the No. 2 product is run into still G for distillation, but I take the precaution when using this hot process, to run the cooled and settled alcohol through a filter F on its way to the still by opening valves 24 and 26 and shutting valve 27, so as to filter out any of the small particles of No. 1 product which might have been carried along.

The precipitate on the filter bed $d^4$ is washed with pure cold alcohol by opening valve 36, located in pipe $s$, communicating with pipes $h$ and $i$, and it is freed from the alcohol it contains by turning steam on the coil 33 and opening valves 15, 18 and 21, being the same way the fat in separator B is treated after the alcoholic washing.

Product No. 1 can be further refined or whitened by distillation $in$ $vacuo$ or with superheated steam or both, and for this purpose it is introduced into still H which communicates with the reservoir J through a bent neck passing through condenser I. A vacuum is made in the apparatus by opening valve 22 which communicates with the vacuum pump K, and when superheated steam is turned on at valve 30 it escapes through the perforations of pipes 35 and passes through the fat which distills over with the steam into the neck of the still where it is condensed and run into receiver J.

Chemically considered, wool-fat is a mixture or combination of "cholesterin" or its isomers or allied substances or alcohols, with various fatty acids or resinous matters and sometimes of such matters in a free state. The exact chemical relationship of these, as they exist in the original wool-fat on the sheep, is doubtless very complex and probably has never been accurately determined and in the nature of the case may be undeterminable. In the wool-fat itself, they no doubt vary under different circumstances and may be considerably affected by the process or materials used in its extraction or recovery and of course therefore the chemical constituents of the divided products will be proportionately affected thereby.

After considerable investigation I am of the opinion that "true cholesterin" seldom if ever exists in the free state in wool-fat when extracted from wool (in its natural state) with chemically inactive solvents, and of course therefore under such circumstances it would not appear in either of the products herein described and I do not wish to base any claim upon its presence in or absence from either of these products, as even when present its solubility in cold alcohol probably depends upon other questions than mere temperature. In describing therefore the chemical constituents of said products No. 1 and No. 2, it is sufficient to say that the first named product consists principally of such of the ethers or fats of "cholesterin," "iso-cholesterin" and other alcohols and allied substances as are not readily soluble in cold alcohol, while product No. 2 is principally composed of free fatty acids, certain fatty ethers and of the resinous gummy or odorous constituents of wool-fat so far as such combinations of substances have remained or will remain in solution in alcohol at a temperature at least as low as 32° Fahrenheit.

Physically considered, No. 1 product is an opaque solid or semi-solid (according to temperatures and somewhat according to the class of wool to which it owes its origin) and generally inodorous fatty matter only sparingly soluble in cold alcohol, of a yellow or reddish yellow color, (when not pure or discolored by metals, alkalis, heat, &c., it may be green, brown or even black;) specific gravity at 60° Fahrenheit about 9.6. The melting point (in samples observed) ranges from 74° to 82° Fahrenheit.

No. 2 product is transparent or translucent and generally fluid or semi-fluid at ordinary temperatures, of a yellowish red to a dark wine or brown color (when impure or discolored and somewhat opaque), generally inodorous and generally possessing a resinous and sticky or gummy nature, and is readily soluble in cold alcohol. Specific gravity at 60° Fahrenheit usually a little greater than 10 (or water).

In the foregoing specification both ethylated and methylated spirits are included in the term "alcohol," but I prefer to use ethylated spirits as I find the results therefrom to be most uniform and best effected.

What I claim as new, and desire to secure by United States Letters Patent, is—

1. The method or process of refining wool-fat and separating it into certain constituent parts, the same consisting in treating it with cold alcohol, thereby separating from the wool-fat that part which is soluble in cold alcohol, said part consisting principally of free fatty acids, certain fatty ethers and resinous gummy and odorous constituents of wool-fat, then decanting the resulting solution, thereby leaving behind that part of the wool-fat which has not dissolved in cold alcohol and which consists principally of certain ethers or fats of "cholesterin," "iso-cholesterin" and other alcohols or allied substances and then eliminating the alcohol from the said resulting solution to form one product, while the undissolved part when freed from alcohol forms another product substantially as hereinbefore described.

2. The process of refining wool-fat and separating it into two constituent parts, which consists in mixing or incorporating cold alcohol, or hot alcohol and subsequently cooling, with wool-fat, and separating from said wool-fat, the free fatty acids, certain fatty ethers along with its resinous, sticky gummy and odorous constituent parts which are held in solution in this cold liquor while the other or fatty and generally inodorous constituent part of the wool-fat, consisting principally of certain ethers or fats of "cholesterin," "iso-cholesterin" and other alcohols or allied substances, remains undissolved or in suspension in said solution, then eliminating the alcohol from the soluble constituent part and from the suspended or residuary constituent part, the thus resulting two products being separated constituent parts of the original wool-fat, substantially as described.

3. As a new article of manufacture the refined opaque, fatty product, consisting principally of certain ethers or fats of "cholesterin," "iso-cholesterin" and other alcohols or allied substances, and resulting from wool-fat after the latter is freed from its fatty acids and certain fatty ethers, and from its resinous, sticky, gummy, odorous or other constituents which are soluble in cold alcohol substantially in the manner as hereinbefore described.

4. As a new article of manufacture the refined transparent or translucent product composed principally of the free fatty acids, certain fatty ethers, and of the resinous, sticky, gummy, odorous or other constituents of wool-fat soluble in cold alcohol and separated from the opaque fatty product composed principally of certain ethers or fats of "cholesterin," "iso-cholesterin" and other alcohols or allied substances, forming the other constituent part of wool-fat, substantially in the manner as hereinbefore described.

In testimony whereof I have affixed my signature in presence of two witnesses.

EMILE MAERTENS.

Witnesses:
GEO. H. REMINGTON,
IDA M. WARREN.